United States Patent [19]

Deets et al.

[11] 4,138,447

[45] Feb. 6, 1979

[54] NITROGENOUS POLYMER COMPOSITIONS

[75] Inventors: Gary L. Deets, Springfield; Peter Shapras, Wilbraham, both of Mass.

[73] Assignee: Monsanto Company, St. Louis, Mo.

[21] Appl. No.: 857,345

[22] Filed: Dec. 5, 1977

Related U.S. Application Data

[63] Continuation-in-part of Ser. No. 807,870, Jun. 20, 1977, Pat. No. 4,097,552.

[51] Int. Cl.$^2$ .......................... C08K 3/06; C08K 3/22; C08K 5/03; C08K 5/06
[52] U.S. Cl. .......................... 260/876 R; 260/45.7 R; 260/45.7 RT; 260/45.7 SE; 260/45.95 G
[58] Field of Search ............... 260/45.7 RL, 45.95 G, 260/45.7 R, 45.7 SE, 876 R; 526/3, 41 (US only)

[56] References Cited

U.S. PATENT DOCUMENTS

| | | | |
|---|---|---|---|
| 3,830,766 | 8/1974 | Praetzel et al. | 260/45.7 RL |
| 3,862,070 | 1/1975 | Fukushima et al. | 260/45.7 R |
| 3,876,568 | 4/1975 | Wysocki | 260/45.7 SE |
| 3,912,792 | 10/1975 | Touval | 260/45.7 SE |
| 3,929,722 | 12/1975 | Bak et al. | 260/45.75 R |
| 3,947,431 | 3/1976 | Gomez | 260/876 R |
| 3,993,621 | 11/1976 | McInerney et al. | 260/45.95 G |
| 4,003,862 | 1/1977 | Albright | 260/880 R |
| 4,016,137 | 4/1977 | Anderson et al. | 260/45.95 G |
| 4,026,963 | 5/1977 | Rim et al. | 260/45.75 B |
| 4,033,916 | 7/1977 | Whelan, Jr. | 260/45.7 RL |

*Primary Examiner*—Melvyn I. Marquis
*Assistant Examiner*—R. A. White
*Attorney, Agent, or Firm*—David Bennett; J. C. Logomasini; S. M. Tarter

[57] ABSTRACT

Polymer compositions comprising a nitrogenous polymer, especially an acrylonitrile-containing polymer, and a halogen-containing flame retardant evolve reduced amounts of hydrogen cyanide on combustion when containing an alkaline earth metal oxide and sulfur.

6 Claims, No Drawings

NITROGENOUS POLYMER COMPOSITIONS

This is a continuation in part of Ser. No. 807,870 filed June 20, 1977, now U.S. Pat. No. 4,097,552 issued June 27, 1978.

BACKGROUND OF THE INVENTION

This invention relates to a method for reducing the amount of noxious gas evolved during the combustion of a nitrogenous polymer.

It is known that when nitrogenous polymers are burned the combustion products are often found to contain hydrogen cyanide. In view of the known toxicity of this gas, it is desirable that the amount of any such gas released when these polymers burn be minimized.

It would also be advantageous if, when a polymer composition is made flame-retardant by the incorporation therein of a halogen-containing material, the emission of hydrogen chloride during decomposition of the polymer at high temperatures could be controlled.

It has now been discovered that the amount of noxious gas evolved during high temperature decomposition of nitrogenous polymers can be controlled by the use of a blend of certain additives.

SUMMARY OF THE INVENTION

The present invention provides a polymer composition comprising a nitrogenous polymer, an halogenated aromatic flame retardant and from 2.5 to 20 percent by weight of an alkaline earth metal oxide and from 2.5 to 20 percent by weight of sulfur, all percentages being based on the weight of the nitrogenous polymer.

This nitrogenous polymer is understood to be a polymer containing nitrogen such as for example polyamides, polyimides, melamine/formaldehyde, urea/formaldehyde, polyurethanes and acrylonitrile polymers (including copolymers). It is found that the additive combination is particularly suitable for use with polymers containing nitrile monomers such as styrene/acrylonitrile polymers and acrylonitrile/butadiene/styrene including variations such a substitution of methacrylonitrile for acrylonitrile, chloroprene for butadiene and chlorostyrene for styrene. The alkaline earth metal oxide component may be added in the form of effectively equivalent compounds which under polymer decomposition conditions yield this oxide, such as barium, calcium and magnesium carbonates or the corresponding hydroxides. All such are intended to be embraced within the term "alkaline earth metal oxide". Of the compounds in this general class, calcium oxide is most preferred. This component is also effective in reducing any hydrogen halide content of the emissions.

The sulfur is in the form of elemental sulfur or a compound which under conditions of polymer decomposition, yields elemental sulfur.

The amount of sulfur used can be from 2.5 to 20 percent by weight based on the polymer weight but is generally between 5 and 15 percent. About 8 to 12 percent by weight gives very good results. Likewise, the amount of the alkaline earth metal oxide employed falls in the range 2.5 to 20 percent by weight based on the polymer weight within from 5 to 15 percent and especially from about 8 to 12 percent by weight, being preferred. Usually equal amounts of the alkaline earth metal oxide and sulfur give satisfactory results.

The halogenated aromatic flame retardant can include any of those which contain one or more halogen atoms attached to an aromatic nucleus. One such class of these compounds may be represented by the following general formula:

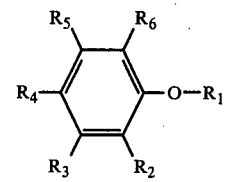

in which $R_1$ is an aromatic group which may be brominated and/or chlorinated or a straight chain or branched alkyl group containing from 2 to 12 carbon atoms and may contain an OH group, and $R_2$ to $R_6$ stand for a a member of the group consisting of hydrogen, chlorine and bromine, said ether containing at least three bromine atoms attached to an aromatic group.

Examples of suitable diaromatic ethers containing bromine attached to the nucleus are tribromodiphenylether, tetrabromodiphenylether, pentabromodiphenylether, hexabromodiphenylether, tribromochlorodiphenylether, tribromodichlorodiphenylether, tribromotrichlorodiphenylether, tetrabromodichlorodiphenylether and decabromodiphenylether. The halogen atoms of these diaromatic ethers may be distributed in any arrangement on the aromatic rings.

Examples of suitable aromatic-aliphatic ethers are the 2-ethylhexyl-, n-octyl, nonyl-, butyl-, dodecyl-, and 2,3-dioxopropyl ethers of tribromophenyl, tribromochlorophenyl and tribromodichlorophenyl. The most preferred compound is decabromodiphenylether. Other suitable halogenated aromatic compounds are well known in the art. Examples of patents disclosing suitable flame retardants include U.S. Pat. Nos. 3,833,538, 3,849,369, British Pat. No. 1,372,120 and West German patent publication Nos. 2,328,517, 2,328,520 and 2,328,535.

The amounts of such additive incorporated in the polymer composition will vary with the degree of retardance desired but generally from 5 to 20 parts by weight, based on the polymer weight are used.

The polymer composition may additionally comprise additives such as antioxidants, smoke suppressants, stabilizers of various sorts, fillers and adjuvants for the flame retardant.

It is found that the use of a large amount of the halogenated aromatic flame retardant results in a reduced efficiency from the point of view of HCN emission reduction, possibly because one or both components are used up in reacting with the hydrogen halide. It is therefore advisable when the polymer compositions of the invention comprise a large amount of the halogenated aromatic flame retardant, that the quantities of additives be adjusted to give a balance of the desired properties.

DESCRIPTION OF THE PREFERRED EMBODIMENTS

The examples which follow demonstrate the effectiveness of the compositions of the invention. The important measurements of gas evolved on burning are made using an NBS smoke test chamber. This is a closed chamber adapted to permit two kinds of combustion, smouldering and flaming, indicated as SC and FC respectively. Gases evolved are sampled and analyzed. The actual measurement of the amount of HCN evolved is not considered to be a part of this invention.

In this regard, any method capable of detecting amounts of HCN as low as one part per million can be used to measure the amount of evolved HCN. These methods, which are well known to those skilled in the art, include colorimetric measurements, gas chromatographic measurements and electrochemical measurements. The results obtained are expressed in parts per million by volume per 10 grams burned (ppmv/10g).

The NBS Smoke Test Chamber is fully described in ASTM Special Technical Publication 422, page 174.

EXAMPLES 1-7

These Examples demonstrate the effectiveness under both flaming and smouldering conditions of two compositions of the invention and demonstrate the synergistic effect obtained using the combination by comparison over either component alone.

For Examples 1 to 5 and comparative Examples C1 to C4, the base polymer is a copolymer of styrene and acrylonitrile polymerized in the presence of a polychloroprene rubber and containing 5.5 parts by weight of a flame retardant having the formula:

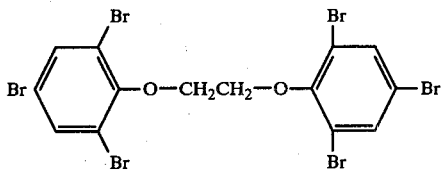

and 5.5 parts by weight of antimony trioxide. The polymer composition comprises 30 percent by weight of acrylonitrile which is present either in the form of superstrate grafted onto the polychloroprene rubber or in the matrix polymer.

The results obtained in all the above Examples are set forth in Table I below.

one (or both) of the sulfur or alkaline earth metal oxide additives is missing.

The polymers of the present invention are useful for preparing a wide variety of molded objects such as radio and television cabinets, appliance housings, parts and components for vehicles, furniture and other related items.

It is anticipated that many minor modifications and variations could be made in the invention described herein without changing the essential elements thereof and it is understood that all such modifications and variations are embraced within the purview of this invention.

What is claimed is:

1. A polymer composition comprising a nitrogenous polymer and an halogenated aromatic flame retardant and from 2.5 to 20 percent by weight of an alkaline earth metal oxide and from 2.5 to 20 percent by weight of sulfur, all percentages being based on the polymer weight.

2. The polymer composition of claim 1 in which the nitrogenous polymer is a copolymer containing from 10 to 90 percent by weight of acrylonitrile.

3. The polymer composition of claim 2 in which the polymer comprises a styrene/acrylonitrile copolymer and a diene rubber substrate with styrene and acrylonitrile grafter thereon.

4. The polymer composition of claim 1 which comprises from 5 to 15 percent by weight each of calcium oxide and sulfur based on the polymer weight.

5. The polymer composition of claim 1 in which the amounts of alkaline earth metal oxide and sulfur are substantially equal.

6. A polymer composition comprising a copolymer of styrene and acrylonitrile, a brominated aromatic flame retardant and from 8 to 12 percent by weight, based on the copolymer weight of each of calcium oxide and sulfur.

TABLE I

| Ex. | Additive | Wt.% of Additive (s) | Combustion Conditions | ppmv/10g HCN | Reduction % in HCN |
|---|---|---|---|---|---|
| 1 | Sulfur & Calcuim Carbonate | 5/5 | FC | 180 | 10 |
| 2 | Sulfur & Calcium Oxide | 5/10 | FC | 120 | 40 |
| 3 | | | SC | 110 | 45 |
| 4 | Sulfur & Calcium Oxide | 10/10 | FC | 120 | 40 |
| | | | SC | 80 | 60 |
| C1 | None | — | FC | 200 | — |
| C2 | None | — | SC | 200 | — |
| C3 | Calcium Oxide | 10 | FC | 130 | 35 |
| C4 | Sulfur | 5 | FC | 210 | (−5) |

The results show that the compositions of the invention perform substantially better than those in which

UNITED STATES PATENT OFFICE
CERTIFICATE OF CORRECTION

Patent No. 4,138,447  Dated February 6, 1979

Inventor(s) Gary L. Deets et al.

It is certified that error appears in the above-identified patent and that said Letters Patent are hereby corrected as shown below:

The term of this patent subsequent to

June 27, 1995, has been disclaimed.

Signed and Sealed this

Twenty-fourth Day of April 1979

[SEAL]

Attest:

RUTH C. MASON
Attesting Officer

DONALD W. BANNER
Commissioner of Patents and Trademarks